Oct. 19, 1926.
C. D. GILMAN
1,604,095
TREE LIMB SUPPORT
Original Filed Sept. 24, 1923
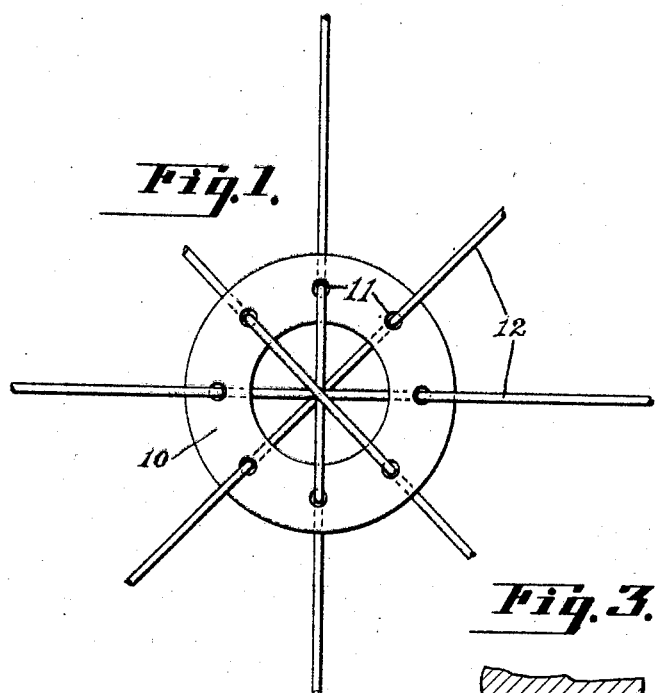
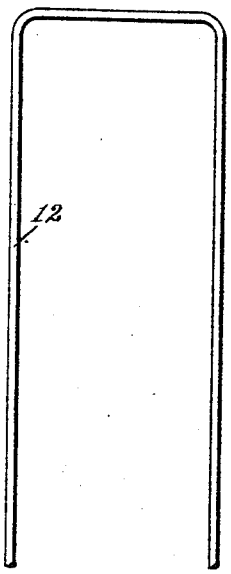
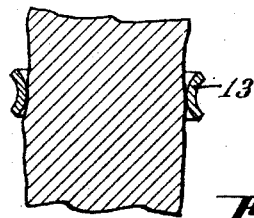
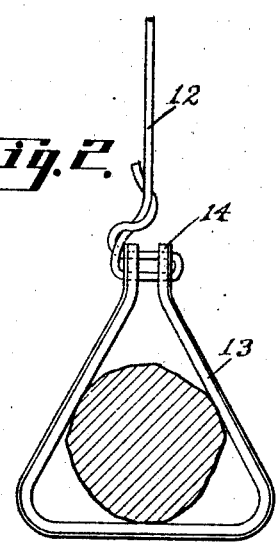
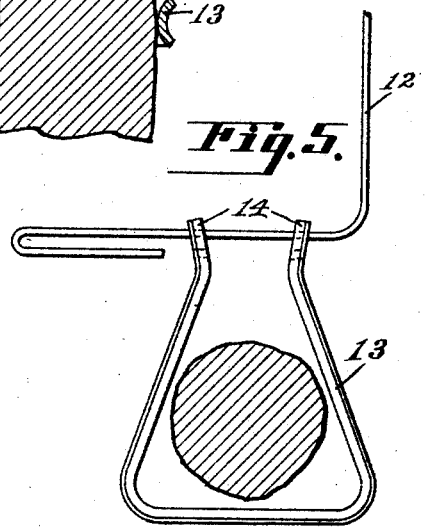
Inventor
CHARLES D. GILMAN
By Dewey, Strong,
Townsend & Loftus
Attys.

Patented Oct. 19, 1926.

1,604,095

UNITED STATES PATENT OFFICE.

CHARLES D. GILMAN, OF OAKLAND, CALIFORNIA.

TREE-LIMB SUPPORT.

Application filed September 24, 1923, Serial No. 664,336. Renewed July 27, 1926.

This invention relates to a method of, and apparatus for, supporting tree limbs.

Heretofore the bracing of limbs of fruit trees against the weight of the fruit has been rather expensive, both from the standpoint of initial cost and the cost of installation. The oldest method of supporting tree limbs is by means of wooden stakes or props resting on the ground, but the cost of these has so advanced in recent years as to make their use prohibitive. Moreover, they deteriorate rapidly and by their presence around the trunk of the tree they interfere with necessary orchard operations. Latterly wire braces have been proposed consisting of a central ring from which the tie wires radiate to the tree limbs. As hitherto constructed a screw eye is fastened to each limb of the tree and a tie wire is then hooked on to each screw eye and securely twisted with pliers. The inner ends of the tie wires are then fastened to a central ring by means of a figure 8 twist. These operations require a great deal of time and skill and necessitate the employment of two men. The screw eyes injure the trees as does also climbing of the tree which is necessary to connect the tie wires to the central ring. Also, if the limb becomes unduly heavy from the weight of the fruit the screw eyes are likely to pull out.

The present invention contemplates the use of wires, but overcomes the objections and disadvantages above noted. It can be applied quickly and easily and will not injure the tree limbs and does not necessitate climbing of the trees. One man working alone can do all the wiring and accomplish a great deal more in a given time than two men working together and using the prior wiring methods.

The invention makes use of a center disk or plate having perforations through which wires may be strung, the ends of the wires continuing in opposite directions to the tree limbs which are diametrically disposed. A novel form of clamping band encircles the limbs of the tree and the wire ends are fastened to these clamping bands in a simple manner which does not require the use of tools. The wires can be threaded on to the central disk or plate while the operator is on the ground, and, thereafter, positioned in the tree in the form of a web. It is then only necessary for the operator to place the clamping bands around the various limbs and tie the wire ends thereto, and this can be done readily by mounting a ladder without climbing into the tree.

One form which my invention may assume is exemplified in the following description and illustrated in the accompanying drawings, in which—

Fig. 1 shows a plan view of a centrally arranged disk or plate with a plurality of wires threaded therethrough.

Fig. 2 shows a plan view of the clamping band in place on the limb of a tree with the wire end fastened thereto.

Fig. 3 shows a vertical sectional view of the clamping band in place on a tree limb.

Fig. 4 shows a plan view of a tie wire bent into the form of an elongated U for convenience in swinging the central ring or plate thereon.

Fig. 5 shows a plan view of the clamping band illustrating the manner of connecting the end of a tie wire thereto.

I prefer to make use of a plate or disk 10 having a series of perforations 11 around its periphery. The wires 12, before being assembled on the disk 10, are bent in the form of an elongated U, as shown in Fig. 4. The plate or disk is strung on as many of these wires as may be required to support the limbs. This is done by passing the legs of each U-shaped wire through oppositely disposed openings 11 and thereafter bending the legs outwardly, so that they extend in opposite directions, as shown in Fig. 1. A sort of a web is thus formed and this can be done while the workman is on the ground. Thereafter the web can be laid in the tree with the disk or plate occupying a central position therein.

I provide a novel form of clamping band 13 to fit around each limb to be supported. This band is substantially triangular in plan with open ends 14, each provided with two perforations or openings spaced horizontally apart. The ends of the clamping band are spread apart so as to fit over the tree limb and the open ends are then moved together. The end of a tie wire is made fast to this clamping band by passing it through aligned openings in the ends of the clamping band and then forming a U bend in the end of the wire, as shown in Fig. 5.

The terminal of the U bend is then passed back through the remaining aligned openings in the ends of the clamping band and the free end of the wire is then given a simple twist or bend such as shown in Fig. 2. Such a fastening has been found to afford great security.

The shape of the clamping band is important. It will be noted that its sides are made concave, as shown in Fig. 3. This adds to the crushing strength of the band and also prevents its being distorted, and, in addition, gives a smooth and rounded surface for contact with the tree. The triangular shape of the band affords greater pulling strength and adapts the band to many different sizes and shapes of objects. On small sizes of tree limbs the triangular band will have contact at two points, whereas in larger sizes it may contact with the limb at three points.

Such clamping band and mode of connecting a tie wire thereto may obviously be used for many different purposes.

Various changes in the construction and arrangement of the several parts herein shown and described may be employed without departing from the spirit of my invention as disclosed in the appended claims.

Having thus described my invention, what I claim and desire to secure by Letters Patent is:

1. An apparatus for supporting tree limbs and the like comprising a plurality of wires each bent into the shape of an elongated bail, a perforated plate adapted to be strung on the legs of said wires, the legs of the wires being adapted to be bent after the plate is strung thereon so that they radiate from the plate, and a connection for connecting each wire end to a tree limb.

2. An apparatus for supporting tree limbs and the like comprising a disk having a plurality of perforations formed therein in circular formation about its center, a plurality of wires threaded through diametrically opposed perforations in the disk and then bent so that the ends extend in opposite directions, and means for connecting each wire to a tree limb.

3. An apparatus for supporting tree limbs and the like comprising a disk having a plurality of perforations formed therein at spaced distances apart and equal distances from its center, a plurality of wires the ends of each of which are threaded through diametrically opposed perforations in the disk, and a clamping band to fit around the limb of a tree to receive the end of a wire.

CHARLES D. GILMAN.